United States Patent [19]

Price

[11] 4,296,605
[45] Oct. 27, 1981

[54] COMPRESSION RELIEF RETARDERS FOR SUPERCHARGED INTERNAL COMBUSTION ENGINES

[75] Inventor: Robert B. Price, Manchester, Conn.

[73] Assignee: The Jacobs Manufacturing Company, Bloomfield, Conn.

[21] Appl. No.: 120,557

[22] Filed: Feb. 11, 1980

[51] Int. Cl.³ .............................................. F02B 37/00
[52] U.S. Cl. ...................................................... 60/599
[58] Field of Search .......................... 60/599; 123/563

[56] References Cited

U.S. PATENT DOCUMENTS

| | | | |
|---|---|---|---|
| 3,220,392 | 11/1965 | Cummins | 123/321 |
| 4,010,613 | 3/1977 | McInerney | 60/599 |
| 4,062,188 | 12/1977 | Cutler et al. | 60/599 |

OTHER PUBLICATIONS

"Retarders for Commercial Vehicles", Mechanical Engineering Publications, Ltd., (London 1974).

Primary Examiner—Michael Koczo, Jr.
Attorney, Agent, or Firm—Donald E. Degling

[57] ABSTRACT

An engine braking system is provided for an internal combustion engine of the Otto or Diesel type fitted with an exhaust gas supercharger and an air-to-air intercooler driven by a turbofan and having a gas compression relief type of engine brake. A control valve is provided in the gas flow passage communicating with the turbofan which drives the air-to-air intercooler using air compressed by the supercharger. The control valve is actuated automatically to inhibit flow of air through the turbofan whenever the gas compression relief engine brake is operated.

20 Claims, 7 Drawing Figures

COMPRESSION RELIEF RETARDERS FOR SUPERCHARGED INTERNAL COMBUSTION ENGINES

BACKGROUND OF THE INVENTION

1. FIELD OF THE INVENTION

This invention relates to engine retarders of the compression relief type used in connection with supercharged internal combustion engines equipped with an air-to-air charge cooling system operated by a turbofan. More particularly the invention relates to a solenoid activated valve designed to deactivate the turbofan when the compression relief engine retarder is in operation.

2. PRIOR ART

For many years it has been recognized that vehicles, and particularly trucks, equipped with internal combustion engines of the Otto or Diesel type should be provided with some form of engine retarder in addition to the usual wheel brakes. The reason for this is that the momentum of a heavily loaded vehicle descending a long grade is so great that the vehicle wheel brakes may easily be overheated, resulting in "brake fade", and, in some cases, may be destroyed.

Various types of engine retarders have been developed including hydrokinetic retarders, electrical retarders, compression relief engine brakes and exhaust brakes. Each of these types of engine retarder has been described in the book "Retarders For Commercial Vehicles" published by Mechanical Engineering Publications, Ltd. (London, 1974).

The present invention relates particularly to engine retarders of the compression relief type in which an engine is converted temporarily into an air compressor by opening the exhaust valves at or near the end of the compression stroke of the engine. By so opening the exhaust valves out of sequence, the energy required to compress air in the cylinder is released through the exhaust system instead of being recovered during the power stroke of the engine. This energy, known as the retarding horsepower, may be a substantial portion of the power ordinarily developed by the engine during a fueling mode of operation and is effective as a supplemental braking system. The retarding horsepower developed by a typical engine, such as the Mack 676 engine fitted with a Jacobs engine brake, may be in the vicinity of 200 horsepower at an engine speed of 2100 RPM. The Jacobs engine brake is described in detail at pp. 23-30 of the publication "Retarders For Commercial Vehicles" referred to above and is described generally in Cummins U.S. Pat. No. 3,220,392.

Frequently, in order to increase the power of an internal compression engine, superchargers have been installed which increase the pressure, and therefore the mass, of the air charged into the engine. With a greater mass of air in the cylinder, more fuel can be combusted and higher mean effective pressures (M.E.P.) obtained, thus increasing the power output of the engine. While various types of superchargers have been utilized, a common and popular form of supercharger is a turbine driven centrifugal compressor, frequently referred to as a turbocharger. In the usual turbocharger, the turbine is driven by the exhaust gases leaving the exhaust manifold.

Bearing in mind that the volume of air compressed by the turbocharger varies directly with its absolute temperature, the engine operation can be improved by cooling the compressed air prior to admission into the inlet manifold. For this purpose an air-to-air intercooler driven by a turbofan has been employed. In the air-to-air intercooler, ambient air is passed in heat exchange relationship with the compressed air from the turbocharger thereby cooling the compressed air prior to its admission into the engine. In order to provide effective heat exchange in the intercooler, a small turbofan is provided. The turbofan, also known as a tip turbine fan, has turbine blades at the tip or circumferential edge of the fan. The fan may be driven by bleeding or bypassing a portion of the air compressed in the turbocharger through the turbine blades of the tip turbine fan. The fan then drives ambient air past the duct containing air compressed by the turbocharger thereby cooling the compressed air.

The advantages obtained by the use of an intercooler include the ability of the engine to burn more fuel and thus to develop more power while operating at lower exhaust temperatures which reduces the mechanical and thermal load on the engine and its various parts.

SUMMARY OF THE INVENTION

Applicant has discovered that the air-to-air intercooler, while effective for its intended purpose at high engine loads when the engine is operating in a positive power mode, is relatively ineffective at low engine load conditions. The reason for this is that at low engine load conditions, the quantity of exhaust gas is greatly decreased and thus the turbocharger operates at a low speed and with reduced output. At such low output, there is insufficient air to drive the tip turbine fan so that the intercooler is ineffective to cool the intake air. Applicant has discovered that the mass flow of air into the engine can be increased in these circumstances by temporarily interrupting the flow of air to the tip turbine fan so that all of the air available from the turbocharger is ingested by the engine. By controlling the system so that the tip turbine is driven only when the engine brake is in operation, applicant is able substantially to increase the retarding horsepower of the compression relief engine brake without affecting the operation of the engine in its powering mode.

DETAILED DESCRIPTION OF THE DRAWINGS

DETAILED DESCRIPTION OF THE INVENTION

Figure 1:
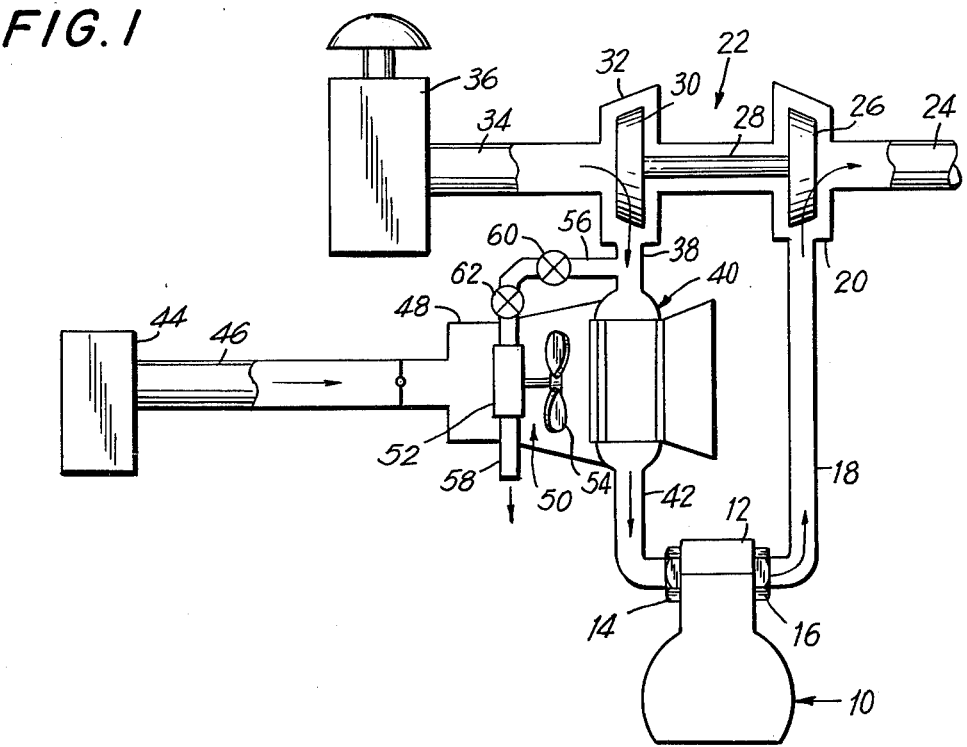
FIG. 1 is a diagrammatic sketch of an internal combustion engine having a compression relief engine brake, fitted with a turbocharger and intercooler powered by tip turbine fan and containing means to deactivate the tip turbine fan.

Referring first to FIG. 1, 10 designates an internal combustion engine having a compression relief engine brake 12 installed therein. The engine 10 is also fitted with the usual intake manifold 14 and exhaust manifold 16. An exhaust duct 18 communicates between the exhaust manifold 16 and the exhaust turbine 20 of a turbocharger 22. Exhaust gas after passing through the exhaust turbine 20 enters the exhaust system 24 which may include an appropriate muffler (not shown).

The exhaust turbine 20 includes a rotatable turbine wheel 26 mounted on a shaft 28 which, at its opposite end, carries a fan wheel 30 located within the air compressor 32. A duct 34 communicates between the intake of the air compressor 32 and an engine air cleaner 36.

The output of the air compressor 32 passes through an outlet duct 38, thence through an air intercooler 40, and a duct 42 and finally into the engine intake manifold 14. The air intercooler 40 may be of the usual plate-fin variety which provides a relatively large heat exchange surface between the compressed air from the turbocharger 22 and ambient air. The ambient air for the intercooler 40 is drawn through an intercooler air cleaner 44 and an entry duct 46 into the ambient air chamber 48.

A turbofan 50 is located within the ambient air chamber 48 and may preferably comprise a turbine (shown diagrammatically at 52) and a fan (shown diagrammatically at 54). An inlet duct 56 communicates between the air compressor outlet duct 38 and the inlet of the turbine while an exhaust duct 58 communicates with the outlet of the turbine 52. The turbofan 50 may have a single rotating element comprising a fan wheel having formed about its outer periphery a series of turbine blades. In this form, known as a tip turbine, gas passed tangentially to the fan wheel portion drives the fan by acting on the turbine blades. The fan, in turn, directs ambient air in heat exchange relationship with the compressed air within the intercooler 40.

In accordance with the present invention, a control valve 60 and a check valve 62 are disposed in series in the duct 56. While in FIG. 1 the control valve 60 and check valve 62 are shown on the inlet side of the turbofan 50, it will be apparent that either or both of these elements could be positioned on the outlet or exhaust side of the turbofan 50. Moreover, the check valve 62 may be located either upstream or downstream from the control valve 60.

Figure 2:
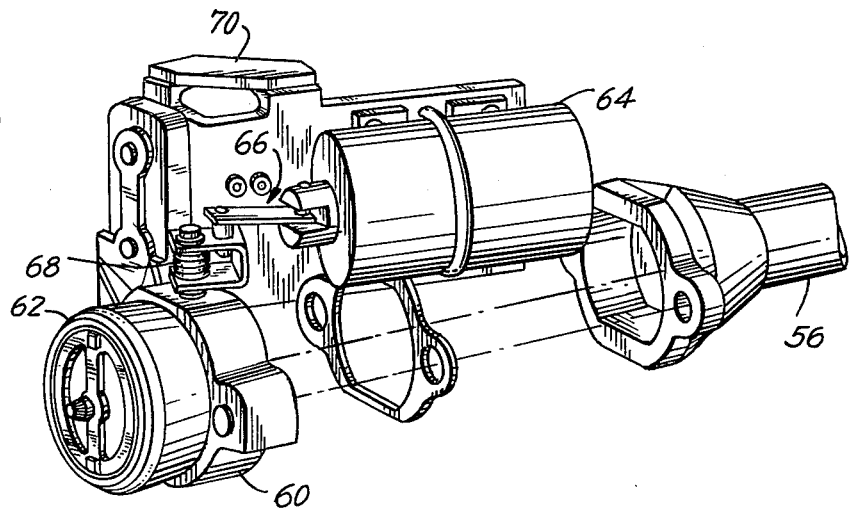
FIG. 2 is a perspective view of a solenoid actuated control valve and check valve arranged to deactivate the tip-turbine fan.

A preferred arrangement of the apparatus in accordance with the present invention is shown in FIG. 2. In this arrangement, the check valve 62 is located upstream from the control valve 60 in the turbofan inlet duct 56. As indicated in FIG. 2, the control valve, specifically in the form of a butterfly valve, is actuated by a solenoid 64 through a linkage 66. The control valve 60 is biased to the open position by a torsion spring 68. The check valve 62, control valve 60 and solenoid 64 may conveniently be mounted on a bracket 70 for attachment to the engine 10.

Figure 3:
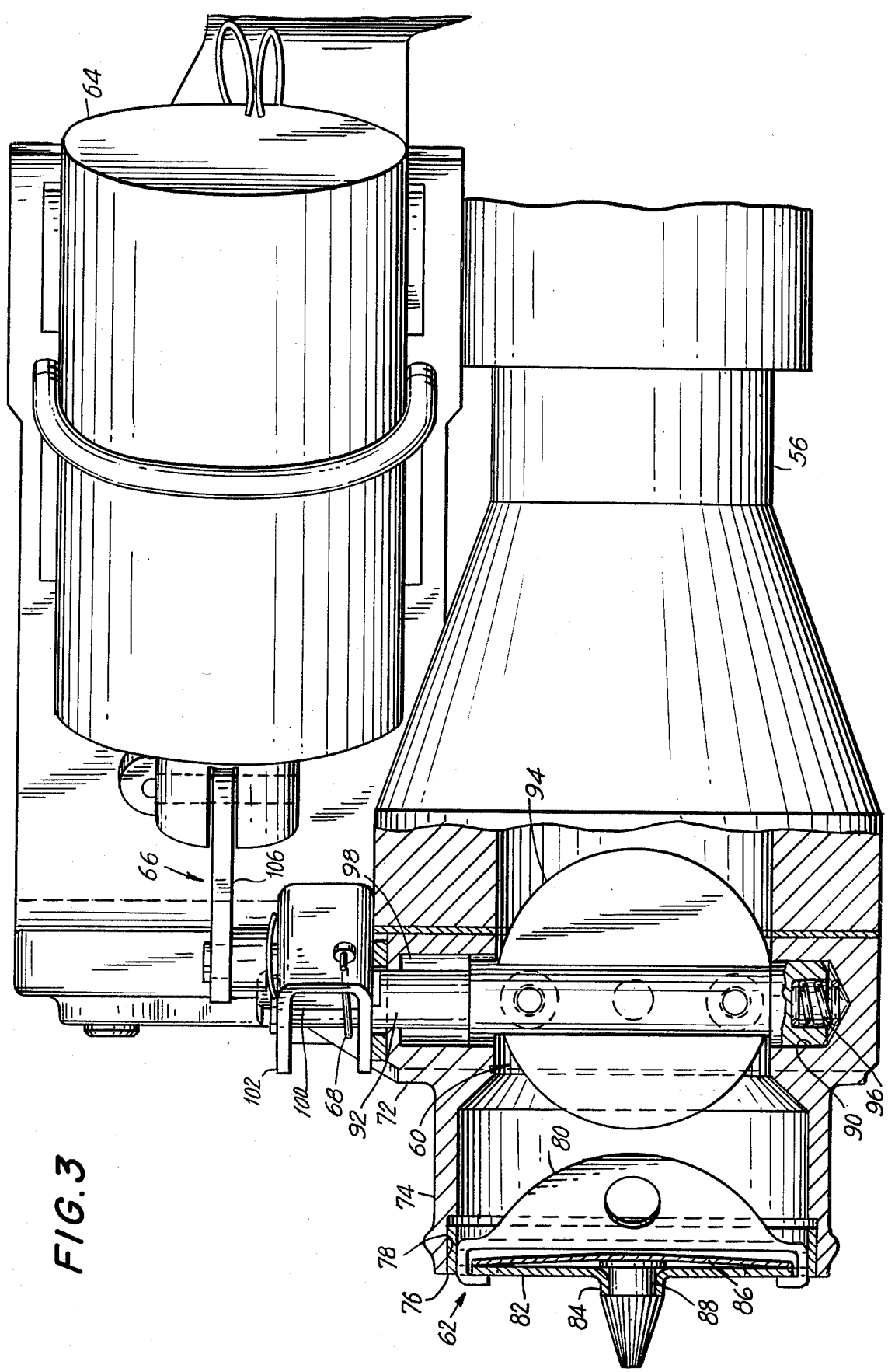
FIG. 3 is a vertical section of FIG. 2 showing the control valve and check valve.
Figure 4:
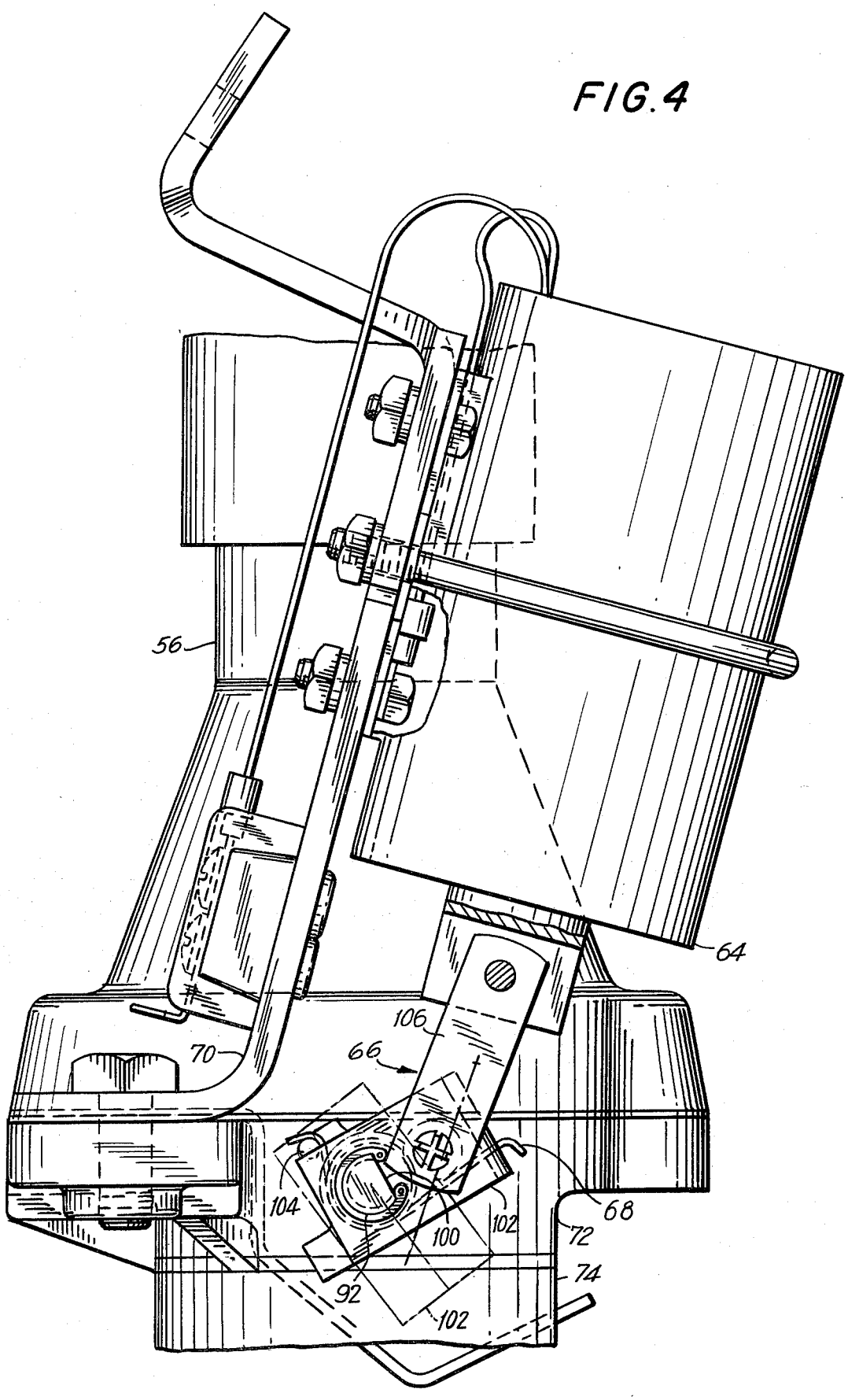
FIG. 4 is a top view of the control valve and its associated solenoid.

Reference is now made to FIGS. 3 and 4 which show a cross section and top view of the apparatus illustrated in FIG. 2. Preferably, the check valve 62 and control valve 60 may be mounted in a common housing 72 having a nipple portion 74. The inlet duct 56 may include a hose portion (not shown) which may be connected between the nipple portion 74 and an appropriate fitting on the duct 38. As shown in FIG. 3, the check valve 62 comprises a retainer ring 76 which mates with a bore 78 in the end of the nipple portion 74. A deflector 80 is fitted within the retainer ring 76 and carries on one end a foraminous valve seat 82. The valve seat 82 is provided at its central area with a valve guide 84. A circular valve 86 formed from flexible material and having a centrally disposed pin 88 which mates with the valve guide 84 is disposed between the valve seat 82 and the deflector 80. The check valve 62 thus permits air to flow from left to right as shown in FIG. 3 but not from right to left.

A bore 90 is formed in the housing 72 transverse to the horizontal axis of the housing. A shaft 92 is journalled for rotation within the bore 90 and carries, within the housing 72, a disc 94 which forms a butterfly valve. Preferably, the bore 90 does not extend all the way through the housing 72 so that the lower end of the bore 90 provides a pivot seat for the shaft 92. A spring 96 may be placed in the bore 90 to bias the shaft 92 against the end of a bushing 98 thereby forming a seal for the shaft 92. The end of the shaft 92 which extends above the housing 72 is provided with a flat 100. A U-shaped bracket 102 mates with the flat 100 on the shaft 92 to provide means for rotating the shaft 92 with respect to the housing 72. One end of the torsion spring 68 carried by the shaft 92 bears against a pin 104 mounted in the housing 72 while the opposite end bears against the U-shaped bracket 102 so as to bias the disc 94 of the control valve 60 in an open position. Preferably, the disc 94 is eccentrically mounted on the shaft 92 so that air flowing through the control valve 60 will exert a force tending to turn the disc 94 to the open position. A link 106 pivotally connects the U-shaped bracket 102 and the armature of the solenoid 64. When the solenoid 64 is activated, the motion of the armature rotates the shaft 92 and the disc 94 thereby closing the control valve 60.

Figure 5:
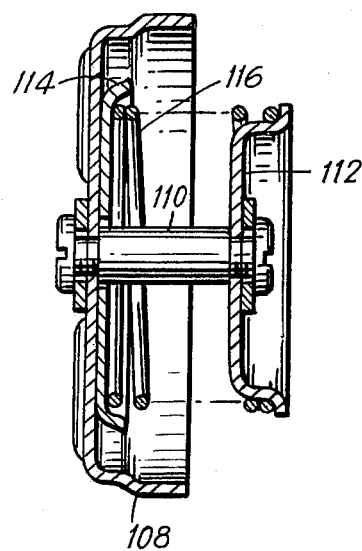
FIG. 5 is an alternate design of a check valve suitable for use in the present invention.

In FIGS. 2-4 the control valve 60 is illustrated as a butterfly valve and this is a preferred form for the control valve. However, it will be understood that other types of valves could be employed, including slide or gate valves, poppet valves or pivoted valves. In like manner, the check valve 62 may take other forms. FIG. 5 shows an alternative check valve in the form of a poppet valve. In this form, the valve retainer and seat 108 engages the bore 78 of the housing 72 and has one or more apertures formed in its face. A shaft 110 is rigidly attached at one end at the central region of the valve retainer and seat 108 and at the opposite end to the center of the disc shaped spring retainer 112. A disc-shaped poppet valve 114 is biased against the inner face of the valve retainer and seat 108 by a compression spring 116 and is adapted to slide along the shaft 110. Air moving from left to right as viewed in FIG. 5. can pass through the valve by forcing the poppet valve 114 away from the valve retainer and seat 108. However, air cannot pass through the valve from right to left as viewed in FIG. 5 as, in this instance, the poppet valve 114 would be urged into sealing engagement with the valve retainer and seat 108.

Figure 6:
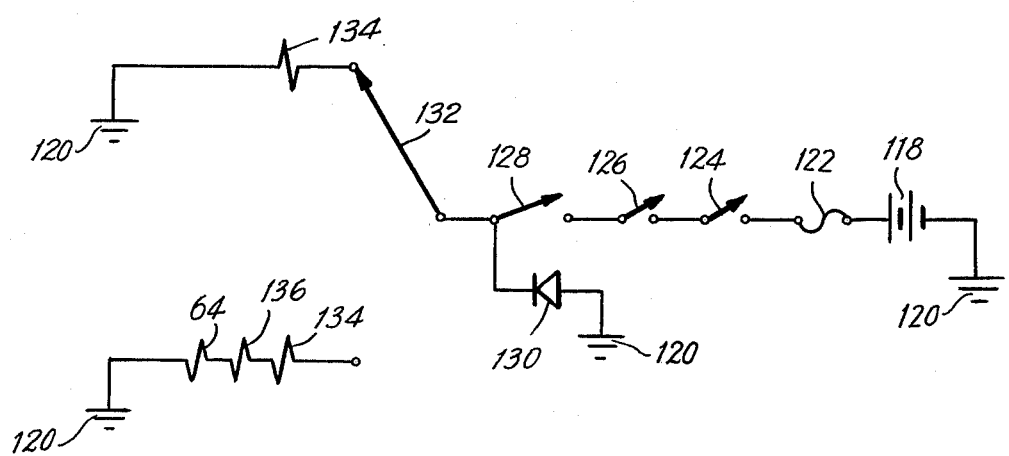
FIG. 6 is a schematic circuit diagram for controlling the system of the present invention.

FIG. 6 is a schematic of the electrical control system for a Jacobs compression relief engine brake modified to incorporate the present invention. The detailed operation of the Jacobs engine brake is described at pp. 23-30 of the publication "Retarders For Commercial Vehicles" and in the co-pending U.S. application Ser. No. 958,119 assigned to the assignee of this application.

Referring to FIG. 6, the vehicle battery is indicated at 118 and the ground at 120. The circuit runs from the battery 118 through a fuse 122, a dashboard switch 124, a clutch switch 126 and a fuel pump switch 128. The fuel pump switch 128 is grounded through a diode 130 and is also connected to a selector switch 132 having at least two positions. In the first position, as shown in FIG. 6, the selector switch 132 energizes a solenoid 134 which, in turn, activates the Jacobs engine brake associated with, for example, three of the six cylinders of the engine 10. Such an operation provides a certain amount of retarding power, but less than the maximum available from the system. In the second position, the selector switch 132 energizes the solenoid 134 and, in addition, solenoids 136 and 64. Solenoid 136 activates the Jacobs engine brake associated with the cylinders of the engine 10 not controlled by solenoid 134 while solenoid 64, when energized, closes the control valve 60.

It will be understood that the selector switch may have additional positions, for example, three positions. In such an arrangement, solenoid 134 might be activated in the first position, solenoids 134 and 136 in the second position and solenoids 134, 136 and 64 in the third position. The use of the selector switch enables the vehicle driver to select a range of retarding power which is appropriate to the braking condition encountered. When a selective braking system is used, the arrangement in accordance with the present invention will usually constitute all or a part of the final increment of retarding power. Nevertheless, if additional gradations of retarding power are desired, the solenoid sequence might be, for example: (a) solenoid 134, (b) solenoids 134 and 64, (c) solenoids 134 and 136, (d) solenoids 134, 136, and 64.

Figure 7:
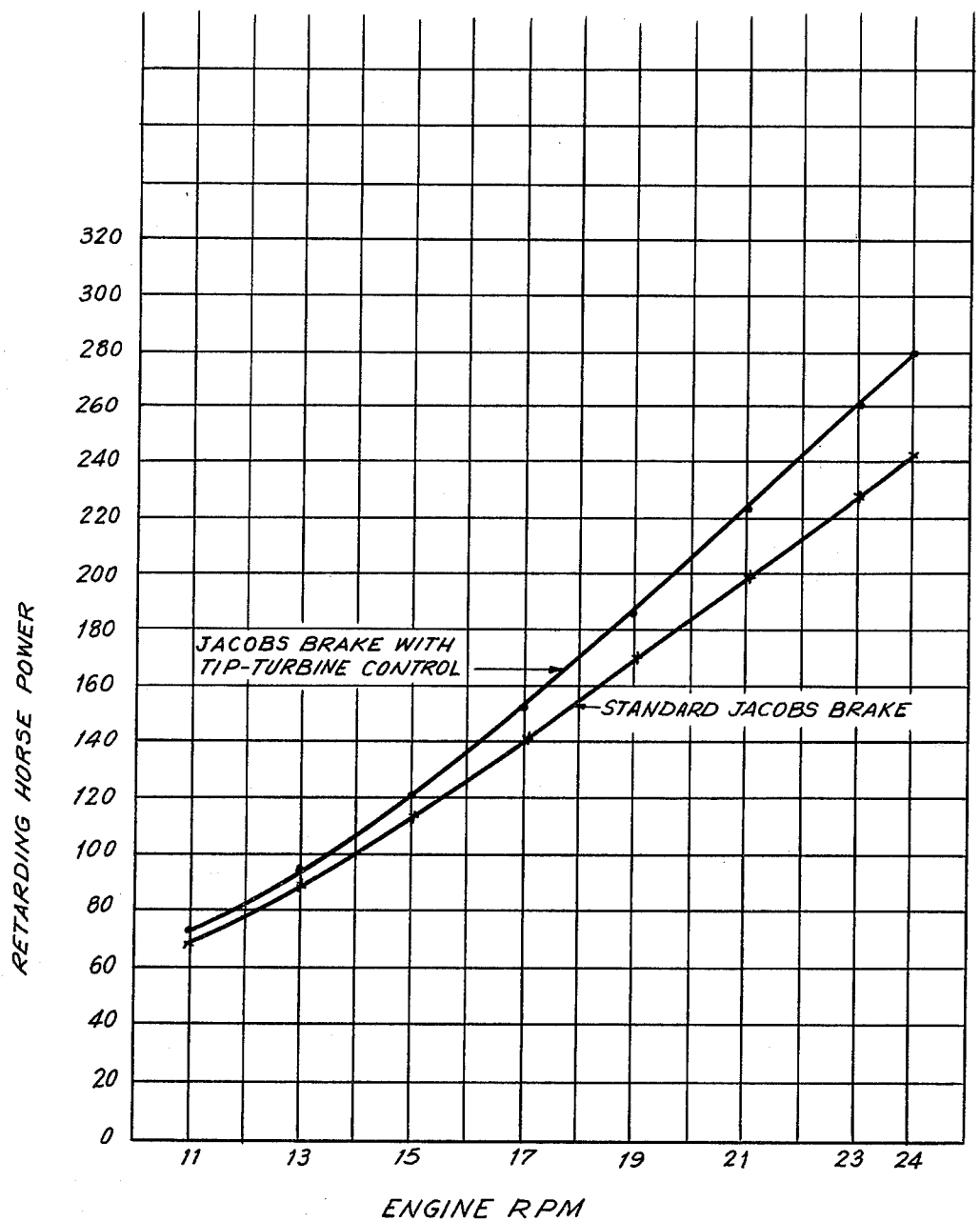
FIG. 7 is a curve showing the effect of the present invention on the available retarding horsepower of the engine.

FIG. 7 is a graph showing the performance of a Jacobs engine brake on a Mack 676 diesel engine with and without the arrangement in accordance with the present invention. In FIG. 7, the lower curve represents the available retarding horsepower from the standard Jacobs engine brake over the operating speed range of the engine. Thus, for example, at the full rated speed of the engine (2100 RPM) the retarding horsepower is about 200 HP. However, by closing the control valve 60 during brake operation, the available retarding horsepower increases to about 220 HP as shown by the upper curve in FIG. 7, an increase of about 10%. Inspection of the curves of FIG. 7 reveals that throughout the normal engine operating range, the apparatus in accordance with the present invention increases the retarding horsepower by about 10%.

It will be noted from FIG. 6 that the solenoid 64 which activates the control valve is energized only when the engine brake is operated and that at all other times the control valve 60 is maintained in the open position by the torsion spring 68. Thus the present invention does not affect in any way the normal operation of turbofan 50 and the intercooler 40 when the engine 10 is operated in the powering mode. During the braking mode, however, the turbocharger 22 tends to slow down because the total quantity of exhaust gas available to drive the turbine 20 decreases substantially. This, in turn, lowers the output of the supercharger compressor 32. At low air pressures, the turbofan 50 ceases to operate effectively so that there is little, if any, cooling of the intake air upon which the engine brake acts. However, even though the turbofan 50 is ineffective for its intended purpose, it still consumes a substantial quantity of air. By preventing the intake air from passing ineffectively through the turbofan 50, applicant is enabled to use this air to increase the mass flow of air through the engine during braking operations. As pointed out above, the novel arrangement according to the present invention improves the performance of the engine brake by about 10%.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. In an engine braking system of the gas compression relief type including an internal combustion engine having inlet and exhaust manifolds, an exhaust gas driven supercharger communicating with said inlet and exhaust manifolds respectively through inlet and exhaust ducts, an air-to-air intercooler communicating with said inlet duct and driven by a turbofan powered by air extracted from said inlet duct through a by-pass duct, engine exhaust valve means, engine exhaust valve opening means to open said engine exhaust valve means near the end of the compression stroke of said engine and electrical circuit means to control said engine exhaust valve opening means, the improvement comprising normally open control valve means located in said by-pass duct and solenoid means mechanically interconnected with said control valve means and electrically interconnected with said electrical circuit means whereby actuation of said electrical circuit means excites said solenoid means and moves said normally open control valve to a closed position to inhibit the flow of air through said by-pass duct.

2. An apparatus as set forth in claim 1 in which said control valve is biased to a normally open position by spring means.

3. An apparatus as set forth in claim 2 in which the opening means is a torsion spring.

4. An apparatus as set forth in claim 1 in which said control valve is a butterfly valve.

5. An apparatus as set forth in claim 4 in which the control valve is biased to a normally open position by spring means.

6. An apparatus as set forth in claim 5 in which the spring means is a torsion spring.

7. An apparatus as set forth in claim 1 and comprising, in addition, a check valve communicating with said control valve.

8. An apparatus as set forth in claim 7 in which said check valve is a diaphragm valve.

9. An apparatus as set forth in claim 7 in which said check valve is a poppet valve.

10. An apparatus as set forth in claim 1 in which said control valve is a butterfly valve and is biased to a normally open position by a torsion spring and comprising, in addition, a check valve communicating with said control valve.

11. In an engine braking system of the gas compression relief type including an internal combustion engine having inlet and exhaust manifolds, an exhaust gas driven supercharger communicating with said inlet and exhaust manifolds respectively through inlet and exhaust ducts, an air-to-air intercooler communicating with said inlet duct and driven by a turbofan powered by air extracted from said inlet duct through a by-pass duct, engine exhaust valve means, engine exhaust valve opening means to open said engine exhaust valve means near the end of the compression stroke of said engine and electrical circuit means to control said engine exhaust valve opening means, the improvement comprising normally open control valve means communicating with the outlet of said turbofan and solenoid means mechanically interconnected with said control valve means and electrically interconnected with said electrical circuit means whereby actuation of said electrical circuit means excites said solenoid means and moves said normally open control valve to a closed position to inhibit the flow of air through said by-pass duct.

12. An apparatus as set forth in claim 11 in which said control valve is biased to a normally open position by spring means.

13. An apparatus as set forth in claim 12 in which the spring means is a torsion spring.

14. An apparatus as set forth in claim 11 in which said control valve is a butterfly valve.

15. An apparatus as set forth in claim 14 in which said control valve is biased to a normally open position by spring means.

16. An apparatus as set forth in claim 15 in which the spring means is a torsion spring.

17. An apparatus as set forth in claim 11 and comprising, in addition, a check valve communicating with said control valve.

18. An apparatus as set forth in claim 17 in which said check valve is a diaphragm valve.

19. An apparatus as set forth in claim 17 in which said check valve is a poppet valve.

20. An apparatus as set forth in claim 11 in which said control valve is a butterfly valve and is biased to a normally open position by a torsion spring and comprising, in addition, a check valve communicating with said control valve.

* * * * *